United States Patent [19]
Katsuma et al.

[11] 4,348,096
[45] Sep. 7, 1982

[54] SOUND MODE SELECTOR DEVICE IN A CAMERA INCORPORATING A BUZZER

[75] Inventors: Makoto Katsuma, Yokohama; Kenichi Shinbori, Kawasaki; Masayoshi Kiuchi, Yokohama; Kiyoshi Alyfuku, Kawasaki, all of Japan

[73] Assignee: Canon Kabushiki Kaisha, Tokyo, Japan

[21] Appl. No.: 204,194

[22] Filed: Nov. 5, 1980

[30] Foreign Application Priority Data

Nov. 9, 1979 [JP] Japan .......................... 54-155620[U]

[51] Int. Cl.³ ........................................... G03B 17/18
[52] U.S. Cl. ................................................. 354/289
[58] Field of Search ....................... 354/289, 127, 128

[56] References Cited

U.S. PATENT DOCUMENTS 3,822,393  7/1974  Karpol .......................... 354/128 X
4,072,973  2/1978  Mayo .............................. 354/128 X
4,238,146 12/1980  Kitamura et al. ............... 354/289 X

FOREIGN PATENT DOCUMENTS 5277451  1/1979  Japan .................................. 354/289

Primary Examiner—Donald A. Griffin
Attorney, Agent, or Firm—Toren, McGeady & Stanger

[57] ABSTRACT

In the disclosed device, the character of sound formed by a sound generator is varied by placing the sound generator in a chamber and varying the chamber to produce at least two sound modes indicating at least two data. According to one embodiment, an aperture in the chamber is covered with a shield accessible from the outside of the camera housing. According to another embodiment, the resonant frequency of the sound is varied by varying the shape of the chamber. In a third embodiment, the chamber is covered and uncovered by varying the registry of two series arranged apertures to the chamber.

12 Claims, 22 Drawing Figures

SOUND MODE SELECTOR DEVICE IN A CAMERA INCORPORATING A BUZZER

BACKGROUND OF THE INVENTION

1. Field of the Invention

This invention relates to cameras with built-in buzzers and, particularly, to a selector device for indicating various data by varying the operational conditions of a single buzzer in the camera.

2. Description of the Prior Art

In the past, photographic cameras could present various types of data, such as a warning that an improper exposure was about to be taken, the state of a self-timer, and data indicating that a strobe for a flash had been fully charged, by making various types of displays or indications visually available to the photographer. Specifically, the various warnings were displayed with light emitting diodes or meters arranged on the camera housing or within the finder. The diodes could be illuminated or flashed. However, photographers generally tend to concentrate on the object image in the field of view of the viewfinder. Thus, visually displayed warning information is often overlooked and it has therefore been difficult to direct the photographer's attention to the various conditions of the camera.

Recently, proposals have been made for indicating warnings, and positive data in the form of sound. Such an acoustic indication may be in the form of a sound of a buzzer whose volume is adapted to be heard by a photographer who holds a camera at eye level so as to warn the photographer of an incorrect exposure setting or to inform the photographer that the charge in a flash unit is of adequate level for operation. However, such as sound is not necessarily sufficiently loud to be heard over a wide range of distances. By contrast, when the buzzer is to be used in connection with a self-timer, the sound must be audible even at long distances from the camera. In order to achieve selective display of various data with only a single buzzer, it is necessary to change the intensity or quality of sound available from the buzzer.

These are hereafter referred to in general terms as sound producing modes.

SUMMARY OF THE INVENTION

With the foregoing in mind, an object of the present invention is to provide a sound producing mode changeover device capable of changing the sound producing mode (in sound volume) of a buzzer so as to make it possible to display a plurality of informations by the one buzzer as the various informations in the camera are acoustically displayed.

Another object of the present invention is to provide a sound producing mode changeover device which enables the photographer to select sound producing modes (in sound quality) of the buzzer.

DESCRIPTION OF THE PREFERRED EMBODIMENTS

The present invention will next be described in greater detail in connection with the embodiments thereof by reference to the drawings.

Figure 1A:
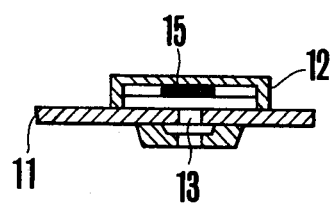
FIGS. 1(a) and 1(d) are various views showing a sound producing mode changeover or selector device embodying features of the present invention and utilizing a movable sound shielding member.
Figure 1B:
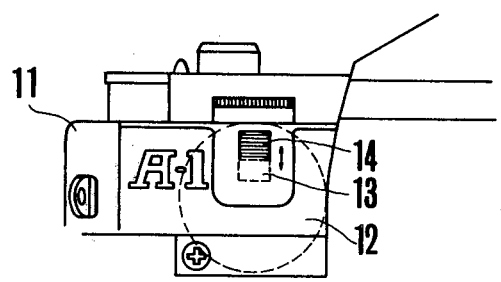
Figure 1C:
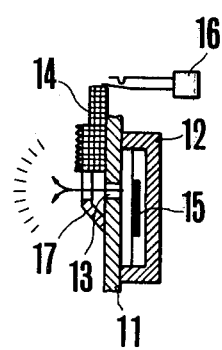
Figure 1D:
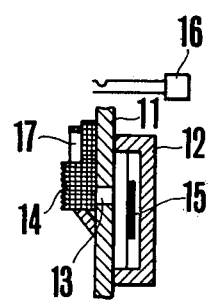

FIGS. 1(a) to (d) show camera body, 11 cover 12 for a sound forming element, a hole 13 through the wall of the camera housing, and a sound forming element 15 incorporated in a space formed by the cover 12 and the camera housing. A shutter 14 opens and closes the area of the hole 13. The shutter 14 is movably mounted to slide on the outer surface of a camera housing by a support member 17, and as shown in FIGS. 1(b), (c) and (d), is arranged to be operated from the outside of the camera housing. When this shutter is closed, the sound given off by the sound forming element 15 can be limited to an intensity just enough to be heard by the photographer as he holds the camera near his ear. When this shutter is opened, the intensity of sound from the sound forming element 15 becomes loud enough so that the photographer can hear it even if standing a long distance away from the camera so as to be informed, for example, of the activation of a self-timer. If the shutter 14 illustrated in the drawings is arranged to cooperate with a self-timer switch 16 when switched, it is possible to change the sound producing mode depending upon the information, as the shutter 14 is opened only when the self-timer is actuated, and is closed when other warning data are presented.

Figure 2A:
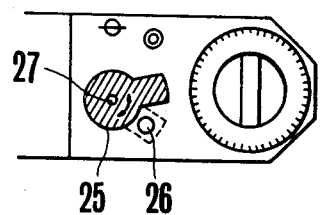
FIGS. 2(a) and 2(b) are views illustrating another device similar to that of FIG. 1 and embodying features of the invention.

FIGS. 2(a) and (b) show an example of arrangement of the sound forming element and the sound producing mode selector device which are independent of each other. These drawings include a base plate 21 of electrically conductive material, is a ring 22 of electrically conductive material, and a casing 23 of a sound forming device. Since the parts 21 and 22 are made up of the electrically conductive material and the sound forming element in the form of a piezo-element is electrically connected at one end terminal thereof to the camera housing, the number of lead wires from the element may be a single one. The sound forming element 24 is suitably located in the interior of the camera, and a hole 26 is provided through the wall of the housing to communicate the interior and exterior of the camera with each other. This hole 26 is opened and closed by a shutter pivotally mounted at a shaft 27, so the sound producing mode is changed. It is noted that the shutter 25 is arranged to cooperate with the self-timer setting member in a similar manner to that described in connection with FIG. 1, so that when the self-timer is in action, a loud sound is given off, while when other warnings and or an OK monitor are presented, a sound small enough to be heard only by the photographer is produced.

Figure 2B:
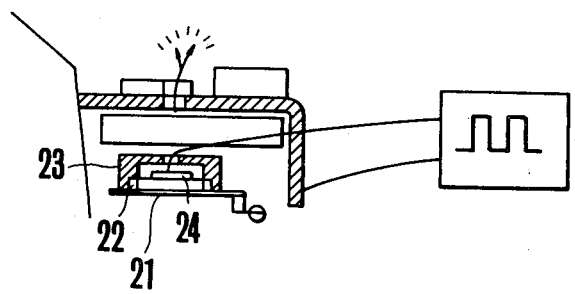
Figure 3A:
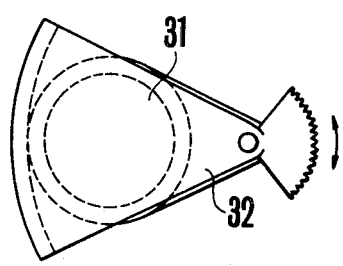
FIGS. 3(a) and 3(c) are two views of a sound producing mode selector device embodying features of the invention and utilizing a sound modulating arrangement.
Figure 3B:
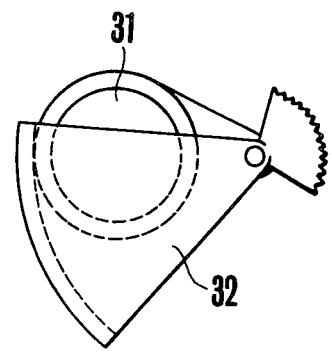
Figure 3C:
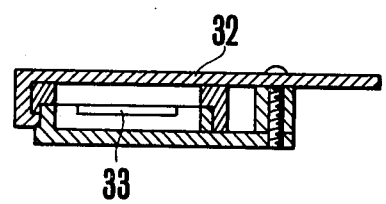
Figure 4:
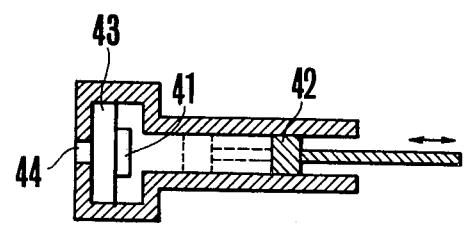
FIGS. 4 and 5 are sectional views illustrating a device similar to that of FIG. 3 and embodying features of the invention.
Figure 5:
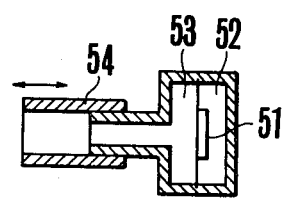
Figure 6:
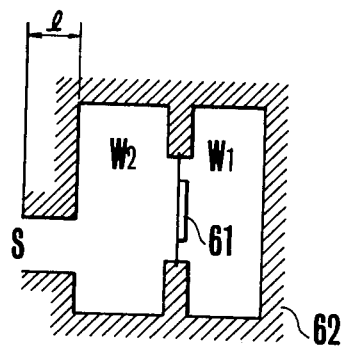
FIG. 6 is a schematic diagram illustrating the resonant effect of the devices in FIGS. 3, 4, and 5.
Figure 7A:
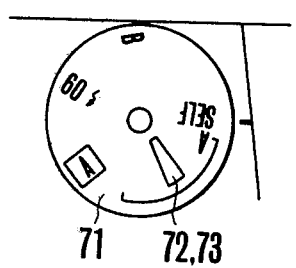
FIGS. 7(a) to 7(d) are two views of a sound shielding arrangement used in a sound producing mode selector device on a camera housing and embodying features of the invention.
Figure 7C:
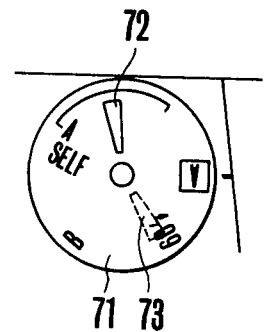
Figure 7B:
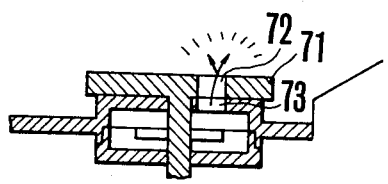
Figure 7D:
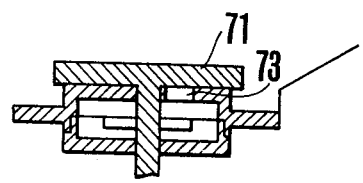

In the examples of embodiment shown in FIGS. 1 and 2 the sound producing mode of the sound forming element is made to change by opening and closing the apertured portion of the camera housing. But, in the next examples of embodiment of the invention, the acoustic resonance mode of the sound forming element is caused to change with the change of the sound producing mode. In FIG. 6, there is shown a schematic diagram explaining the resonance effect of a framework 62 containing the sound forming element 61 such as a piezo-element. In this figure, letting $W_1$ and $W_2$ denote the volumes of the framework 62, S the area of an opening to the outside, and l the length of an apertured portion, the resonance frequency f may be expressed as:

$$(2\pi f)^2 \times \frac{l}{S} \times \frac{1}{C^2} \times (W_1 + W_2) = 1$$

wherein C is the speed of sound. This formula implies that as the size and volume of the frame work, l, S and $W_1+W_2$, vary, the sound pressure, spectral density and spectral distribution vary, thus resulting in variation of the sound producing mode. In the example of FIG. 3, the area S of opening of the apertured portion is selected as the variable factor, and in the examples of FIGS. 4 and 5, the volume $W_1$ (FIG. 4) or $W_2$ (FIG. 5) of the framework is selected as the variable factor in changing the sound producing mode. It is noted here that in the example of FIG. 5, not only the volume $W_2$ but also the length of the opening conduct l is variable. By continuously varying such dimensions of the framework, it is made possible to obtain a wide variety of sound producing modes respectively suited for use in representing the various alarm displays, and automatic selection of one of the sound producing modes can be effected when the corresponding mechanical portion is actuated. If it is desired to increase the sound pressure from the sound forming element to a maximum, the opening area, volume and length only need to be finely adjusted to establish a resonance characteristic. This affords the additional advantage that the size variations of the individual items can be compensated for by such fine adjustment. FIG. 3(a) is a plan view of the apertured portion totally closed, and FIG. 3(b) a plan view of the same as partly opened. FIG. 3(c) is a sectional view. A sector plate 32 serves for adjustment of the opening area above a sound forming element 33. In FIGS. 4 and 5, elements 41 and 51 each represent a sound forming element. An adjusting member 42 serves for varying the volume ($W_1$) of the rear framework; reference numeral 43 represents a portion of the front framework ($W_2$), 44 an apertured portion, 52 a portion of the rear framework ($W_1$), 53 a front framework portion ($W_2$), and 54 an adjusting member for varying the volume of $W_2$ and the length of the apertured portion.

The adjusting members 32, 43, 54 are arranged upon actuation of the self-timer to adjust the framework of the sound forming element to the above-described resonance condition through, for example, a gear mechanism, or a cam mechanism. Thus, when the self-timer is in action, a loud sound is produced, and otherwise a soft sound is generated.

Figure 8A:
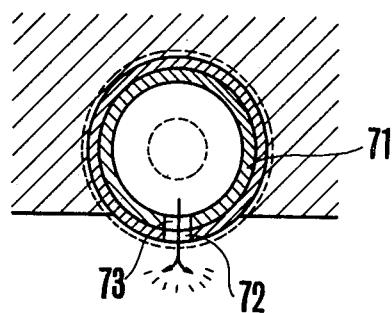
FIGS. 8(a) to 8(c) are views illustrating another device utilizing the principles of FIG. 7 and embodying features of the invention.
Figure 8B:
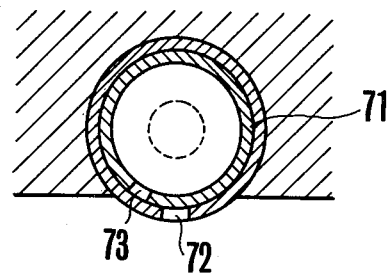
Figure 8C:
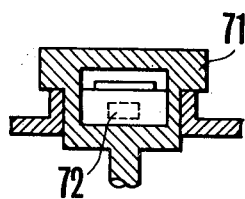

Next, FIG. 7 shows another example embodying the invention. The sound forming element is put into a space within a selector dial 71 to attempt effective utilization of a spare space. As is well known, the interior of the camera housing is occupied by a great number of parts constituting the mechanical system, electrical system and optical system. It is therefore very difficult to create a space which is to be occupied by the sound forming element in this interior. As one method of avoiding this difficulty, the selector dial 71 is employed to accommodate the sound producing element therein. This permits the advantage of affording a co-ordination with the use of the self-timer. As shown in the figure, the wall of the selector dial 71 is provided with a hole 72, and the sound producing element framework is provided also with a hole 73. When these holes 72 and 73 overlap each other, the interior of the sound producing element communicates with the outside of the camera. When the selector dial 71 is set in a position for the self-timer exposure mode, the holes 72 and 73 are aligned with each other, and the sound producing mode is changed to allow for production of a sound sufficiently high intensity to be heard over a wide range of distances. FIG. 8 shows another example where holes of similar function to that of the holes of FIG. 7 are provided not in the upper surface of the selector dial 71 but in the side wall thereof.

Figure 9:
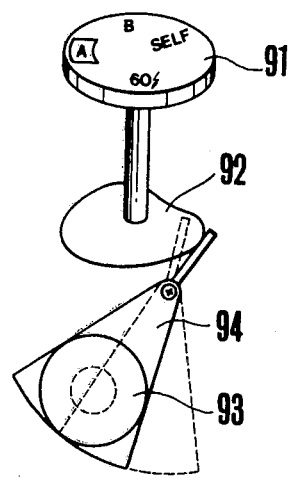
FIG. 9 is a perspective view showing an example of an arrangement of the sound modulating type of sound producing selector device cooperating with a selector switch and embodying features of the invention.

FIG. 9 shows another embodiment of the present invention where as has been mentioned in connection with FIG. 6, the resonance effect is varied to vary the sound producing mode, and where use is made of the sound forming element shown in FIG. 3 and this is arranged to cooperate with the selector dial 91 so as to vary the sound producing mode. FIG. 9 includes a selector dial 91 and is a cam 92. It is this cam that cooperates with the selector dial 91. The camming surface of this cam 92 is configured to actuate an opening area adjusting member 94 over an aperture 93 so that when the self-timer is in action, a loud sound is heard. Thus, the sound producing mode becomes large when in the self-timer exposure mode, and is reduced to as low a level to be heard by the photographer only, when the other exposure modes are selected.

Figure 10:
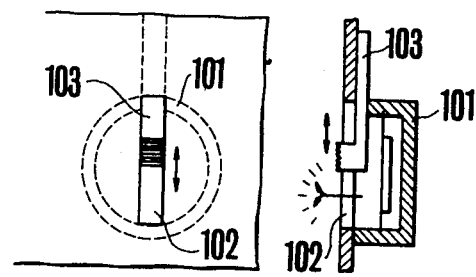
FIG. 10 illustrates a device for continuously changing the sound producing mode of a buzzer and embodying features of the invention.
Figure 11:
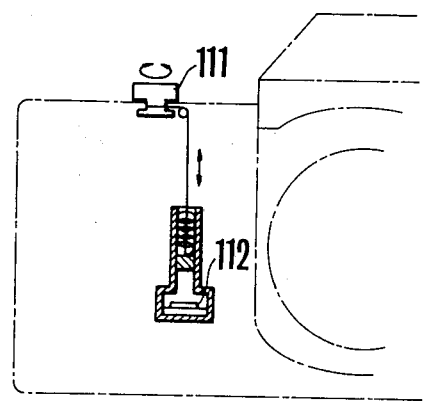
FIG. 11 is another view illustrating another example of a device utilizing a principles of FIG. 10 and embodying features of the invention.

FIG. 10 is an example of continuous variation of the sound producing mode by varying the area of an opening conduct between the sound forming device in the interior of the camera housing and the outside of the camera to produce desired sounds for the photographer. In the apparatus illustrated in the figure, the sound producing device 101 has an aperture portion 102 of which the opening area is made variable by a slide shutter 103. FIG. 11 shows another example where the device shown in FIG. 4 is arranged within the camera housing, and when a knob 111 on the upper panel of the camera housing is turned, the sound producing mode of the sound forming element 112 is continuously varied.

It will be appreciated from the foregoing that the present invention provides a sound producing mode changeover device for incorporation in a camera. With this, the various alarm data and positive data such as the activation of the self-timer are acoustically presented in the correspondingly suited sound producing modes, so that a clear presentation of the display can be effected. Further, a favorite sound to the photographer may be chosen in the display so that when combined with the corresponding visual display, a more certain warning display can be effected.

Though the present invention has been described in connection with the embodiments thereof in which the sound producing mode of the sound forming element for the presentation of display of the activation of the self-timer is differentiated from that when the display of the other photographic data is presented, the present invention is not confined thereto, and it is of course possible that modifications may be made within the scope and spirit of the present invention. For example, the other photographic data in the camera may be displayed by differentiating the sound producing mode.

What is claimed is:

1. A sound producing mode selector device for a camera having a housing, comprising:
   sound forming means;
   chamber forming means for accommodating said sound forming means, said chamber forming means having an apertured portion;
   shielding means for shielding said apertured portion of said chamber means, said shielding means being accessible from the outside of the camera housing, so that at least two data may be indicated by sounds from said sound forming means; and
   selector means cooperative with said shielding means for actuating a self-timer.

2. A device as in claim 1, further including:
   support means for supporting said shielding means to slide along the camera housing.

3. A device as in claim 1, further including:
   a support shaft for rotatably supporting said shielding means on the camera housing.

4. A sound producing mode selector for a camera having a housing, comprising:
   sound forming means;
   chamber forming means for accommodating said sound forming means;
   said chamber forming means having an apertured portion;
   sound modulating means for varying the resonant frequency of said chamber forming means, said modulating means being variable in position from outside of the camera housing so that at least two data are indicated by sounds from said sound forming means; and
   setting means for actuating said sound modulating means and for setting photographic operations of the camera.

5. A device as in claim 4, wherein said sound modulating means includes an adjusting member for varying the area of opening of the apertured portion of said chamber forming means.

6. A device as in claim 4, wherein said sould modulating means includes an adjusting member for varying the capacity of said chamber forming means.

7. A device as in claim 4, wherein said chamber means forms an opening conduit having a length and said sound modulating means includes an adjusting member for varying the length of the opening conduit of said chamber forming means.

8. A sound producing mode changeover device for a camera, including:
   sound forming means;
   chamber forming means for accommodating said sound forming means, said chamber forming means having a first apertured portion; and
   shielding means for shielding said first apertured portion of said chamber forming means, said shielding means having a second apertured portion arranged to register with said first apertured portion of said chamber forming means depending upon a position setting operated from outside the camera housing so that at least two data can be indicated by said sound forming means.

9. A device as in claim 8, wherein said shielding means includes a selector dial for determining photographic operations of the camera.

10. A sound producing mode selector device for a camera having a housing, comprising:
    sound forming means;
    chamber forming means for accommodating said sound forming means, said chamber forming means having an apertured portion;
    a volume varying arrangement for changing the volume of the sound emitted from said chamber means, said sound volume varying arrangement including shielding means accessible from outside the camera housing for shielding the apertured portion to vary the volume of sound emitted in cooperation with a change in the generating condition of the camera; and
    selector means cooperative with said shielding means for actuating a self-timer.

11. A device as in claim 10, further comprising: support means for supporting said shielding means to slide along the camera housing.

12. A device as in claim 10, further comprising:
    a support shaft for rotatably supporting said shielding means on the camera housing.

* * * * *